Figure 2:
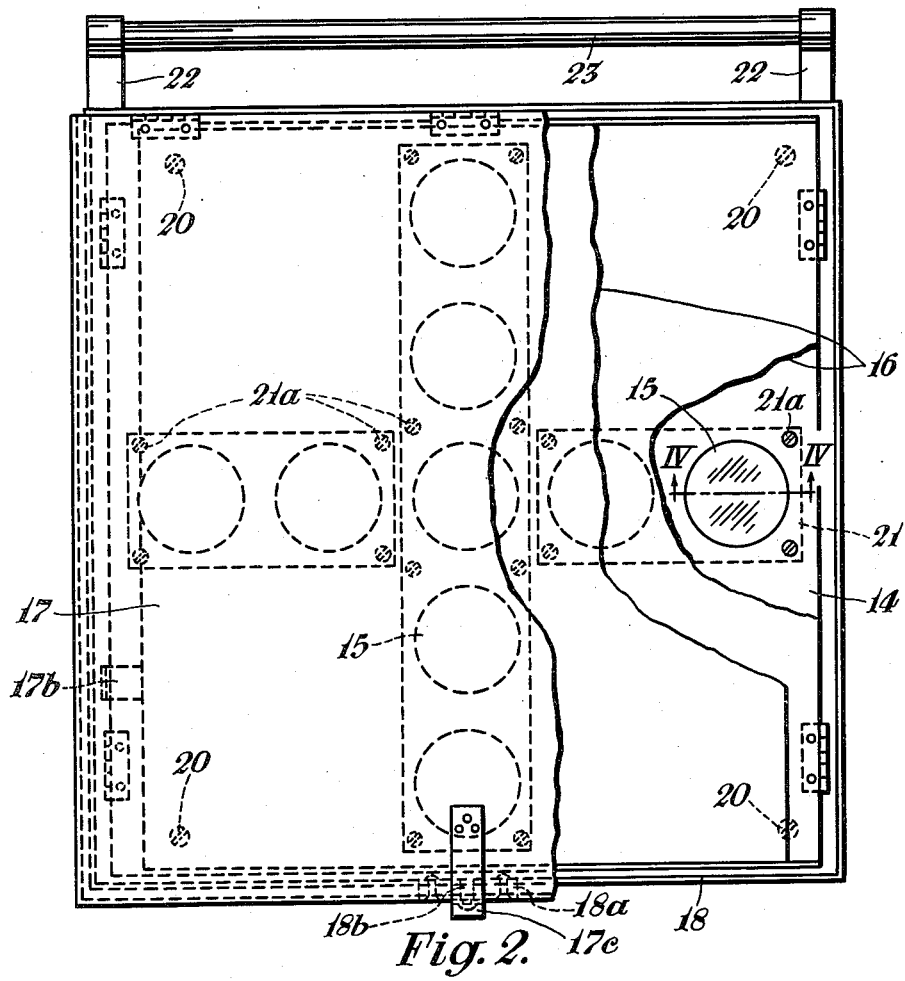

Aug. 26, 1952        W. B. WELLS        2,608,130

TARGET REFLECTOR WITH FOLDABLE HOOD

Original Filed March 27, 1948        2 SHEETS—SHEET 1

INVENTOR.
Wesley B. Wells
BY
HIS ATTORNEY

Aug. 26, 1952  W. B. WELLS  2,608,130
TARGET REFLECTOR WITH FOLDABLE HOOD
Original Filed March 27, 1948  2 SHEETS—SHEET 2
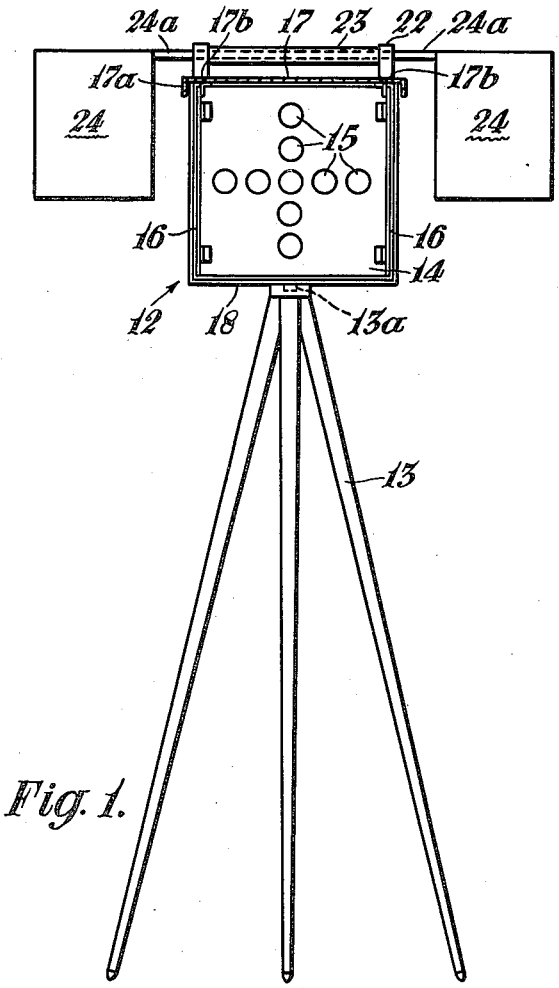
Fig. 1.
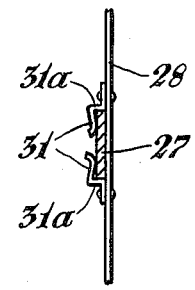
Fig. 6.
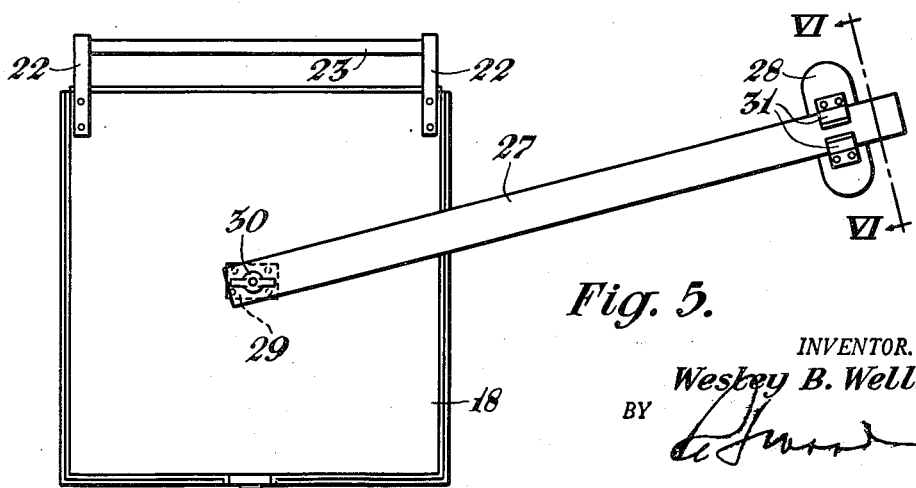
Fig. 5.
INVENTOR.
Wesley B. Wells
BY
HIS ATTORNEY Patented Aug. 26, 1952

2,608,130

UNITED STATES PATENT OFFICE 2,608,130

TARGET REFLECTOR WITH FOLDABLE HOOD

Wesley B. Wells, Wilkinsburg, Pa., assignor to Westinghouse Air Brake Company, a corporation of Pennsylvania Original application March 27, 1948, Serial No. 17,458, now Patent No. 2,520,866, dated August 29, 1950. Divided and this application December 10, 1948, Serial No. 64,506

1 Claim. (Cl. 88—74)

My invention relates to reflector devices, and particularly portable reflector devices for use in connection with a method of aligning signal lamps which is completely described and claimed in my copending application for Letters Patent of the United States, Serial No. 17,458, filed March 27, 1948, entitled Method and Apparatus for Aligning Lamps, which has issued as Patent No. 2,520,866, dated August 29, 1950, and of which the present application is a division.

An object of my inventiin is to provide an improved portable reflector unit for use in connection with such a method of aligning lamps.

Another object is to provide an improved combination reflector and target unit for use in connection with a method for aligning a lamp with an associated sighting device.

I accomplish these objects by providing a portable reflector, of a light, compact structure, which may be mounted at a point where it is desired that the beam from the lamp should strike. In aligning a highway crossing signal, for example, the reflector is mounted in the highway some distance from the signal, and is pointed toward the signal lamp. The lamp is then lighted and the lamp support is adjusted until a reflection of maximum intensity is received at the signal lamp from the reflector.

The reflector is provided with three hinged panels which cover the reflector when it is being carried, and which unfold to form a hood to protect the reflector from outside light sources when it is in use. The reflector is provided with a hollow pipe handle which serves not only for carrying the reflector when folded, but also as a mounting for two red flags, which are used as a warning to motorists when the reflector is set up in a highway.

When it is desired to use the reflector for aligning a lamp with an associated sighting device, a target is mounted on the reflector whose distance and angle from the reflector center are the same as the distance and angle of the sighting device from the center of the lamp. The lamp is then aligned with the reflector by adjusting the lamp support. The sighting device is then aligned with the target by adjusting the mounting of the sighting device. The sighting device and the lamp being aligned, the sighting device may then be used to align the lamp with any desired point by adjusting the signal lamp support.

Other objects and characteristic features of my invention will become apparent as the description proceeds.

I shall describe one form of apparatus embodying my invention, and shall then point out the novel features thereof in the claim.

Figure 3:
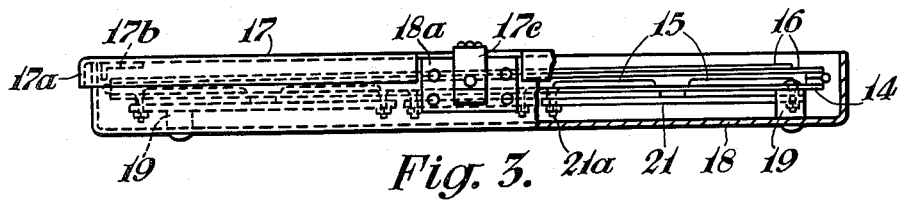
Figure 4:
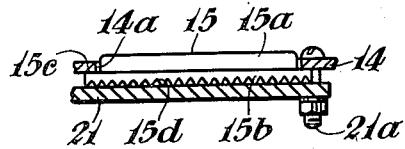

In the accompanying drawings, Fig. 1 is an elevational view of my improved reflector unit unfolded and mounted on a tripod. Fig. 2 is an elevational view on a larger scale of my improved reflector unit with the cover panels closed and portions of them broken away to better illustrate the structure beneath. Fig. 3 is a bottom view of the reflector unit as shown in Fig. 2 with a part of the casing broken away. Fig. 4 is a cross-sectional detail view taken along the line IV—IV of Fig. 2. Fig. 5 is a rear elevational view of the casing of my combined reflector and target, showing the supporting structure for the target. Fig. 6 is a cross-sectional view taken on the line VI—VI of Fig. 5, looking in the direction of the arrows, and illustrating the manner in which the target is mounted on its supporting arm.

Figs. 1 to 4

My improved reflector device is generally indicated by the reference character 12. It appears in Fig. 1 in its open position, mounted on a tripod 13, ready for use, and in Figs. 2 and 3 in its folded or closed position, ready for carrying from one location to another.

The reflector unit 12 includes a reflector panel 14 carrying a plurality of reflector buttons 15. A pair of side panels or wings 16 are hinged at the opposite edges of the reflector panel 14. A top panel or cover 17 is hinged at the top edge of the reflector panel 14. The reflector panel 14 is mounted in a box 18 by means of four studs 19 which are attached to the box and screws 20 which extend through the reflector panel 14 and are threadedly received in the studs 19.

The top panel 17 is provided with a down turned rim portion 17a, which fits over the edges of the box 18 when the reflector unit is closed. The cover 17 is also provided with a pair of downwardly projecting lugs 17b. When the signal unit is open, as shown in Fig. 1, the upper edge of each of the side panels 16 is received between one of the lugs 17b and the rim portion 17a of the cover 17. (The front portion of rim 17a is broken away in Fig. 1 to permit better illustration of the parts behind it.) The top and side panels are thus latched together to form a hood which protects the reflector buttons 15 from sources of light other than the signal lamp toward which they are directed.

The reflector buttons 15 are of a well-known make, being of the type commonly used on highway signs and the like, having a relatively large acceptance angle and a narrow return beam. I prefer to use buttons so constructed that they will accept and reflect only light directed at the button from within an angle of 15 degrees with the perpendicular. In other words, the button should have an acceptance angle of substantially 30 degrees. As best shown in Fig. 4, each button 15 comprises a lens portion 15a and a base portion 15b, of somewhat greater diameter. The lens portion 15a projects through an aperture 14a formed in the reflector panel 14. Since the portions 15a and 15b of the lens are of different diameters, they form a shoulder 15c on the button 15. A backing plate 21 engages the button 15 and holds the shoulder 15c against the reflecting panel 14. The backing plate 21 may be supported on the panel 15 by any suitable means, such as the screws 21a. The reflector buttons 15 have a reflecting back surface 15d.

A reinforcing plate 18a is attached to the bottom of box 18 by any suitable means, for example, by spot welding. This reinforcing plate 18a is provided with a threaded aperture 18b for receiving a threaded mounting post 13a carried on the tripod 13. When the reflecting unit is closed for carrying, as shown in Figs. 2 and 3, a latch 17c on the top panel 17 engages the aperture 18b.

A pair of upwardly extending straps 22 are attached by suitable means to the upper corners of the box 18. The upper ends of the straps 22 are bent over to engage and hold a section of pipe 23, which serves as a handle for the reflector unit when it is in its closed position as illustrated in Figs. 2 and 3.

When the reflecting unit is mounted in the highway, the staffs 24a of a pair of signal flags 24 may be inserted in the opposite ends of the pipe handle 23, so as to warn approaching motorists of the presence of the reflector unit in the highway.

*Operation of Figs. 1 to 4*

When aligning a signal unit, the portable reflector unit 12 is first set up in the highway substantially at the point where it is desired to receive the main beam of the signal. The reflector is preferably mounted substantially at the eye level of drivers of approaching vehicles. The reflecting unit is then directed at the signal. Since the reflector will accept light from an angle up to 15 degrees on either side of a perpendicular line, the reflector unit may be readily directed at the signal by hand with sufficient accuracy so that a person at the signal may observe the reflection of the signal light in the reflector. Having mounted the reflector in the roadway and directed it at the signal unit, the operator returns to the signal unit and proceeds to adjust its mounting until the reflection which he gets from the reflector 12 is of maximum intensity.

The arrangement of the reflector buttons 15 in a cross-shaped formation aids materially in the use of my reflector. The presence of the horizontal and vertical rows of reflector buttons makes it easy for the operator to tell when the edge of the beam passes over the reflector surface. By noting the positions of the lamp unit at which the two edges of the beam are observed, the operator may split the difference between those positions and thereby make sure that the center of the beam is directed at the reflector. Any other arrangement of reflector buttons which includes a horizontal row and a vertical row may be used, but the cross-shaped arrangement of one horizontal row and one vertical row crossing at the center of the reflector is believed to be the optimum arrangement.

*Figs. 5 and 6*

In certain instances, it may be undesirable to use the method of lamp alignment just described, either because of an extreme distance between the signal and the point where the signal is to be received, or because heavy traffic conditions make it impractical to leave an unattended reflector unit standing in the roadway, or for other reasons. For example, railway signals, as distinguished from crossing signals, are sometimes required to be visible for as much as a mile. In such cases, it may be very inconvenient for the operator aligning the signal to mount the reflector a mile away and then return to the signal to align it. When such conditions are encountered, the apparatus illustrated in Figs. 5 and 6 may be used. An extension arm 27 is mounted on the reflector 12, and carries a target 28. A reinforcing plate 29 is attached by suitable means, as by spot welding, to the back of the reflector box 18. This reinforcing plate is provided with a suitable threaded aperture to receive a thumb screw 30, which passes through a suitable aperture in the extension arm 27, and holds the arm 27 in any desirable angularly adjusted position with respect to the reflector box 18. The arm 27 is illustrated as being a flat bar of rectangular cross-section. A pair of spring clamps 31 are riveted or otherwise suitably attached to the back of target 28, so that the target may slide along the arm 27 and be frictionally held in any adjusted position. It should be noted that the spring clamps 31 have flat portions 31a which engage the upper and lower sides of the bar 27 and therefore prevent rotation of the target 28 with respect to the bar.

*Operation of Figs. 5 and 6*

In order to align a lamp using the apparatus of these figures, an operator first attaches a portable sighting device such as the telescope to the background or other part of the signal unit which moves concurrently with the signal lamp as the latter is adjusted. The operator then carefully measures the horizontal and vertical distances between the center of the signal unit and the sighting device. The reflector unit 12 is then set up at any convenient distance and in any convenient direction from the signal lamp 1. The extension arm 27 is attached to the reflector unit 12, and its angular position and the position of target 28 of the arm 27 are adjusted so that the horizontal and vertical distances between the center of the reflector panel and the target 28 are the same as the horizontal and vertical distances between the center of the signal lamp and the telescope. The operator then returns to the signal lamp and adjusts the signal support so that a reflection of maximum intensity is received at the signal from the reflector 12. The direction of the beam from the signal lamp to the reflector is then accurately established. The mounting of the sighting device is then adjusted so that the sighting device is lined up with the target 28. This insures that the sighting device is parallel with the beam from the signal lamp. The signal lamp is then aligned with any desired remote point by adjusting its mounting structure until the sighting device is aligned with that point. It should be noted that in using this method, the reflector 12 may be set up at a convenient point, fairly close to the signal lamp, and out of the path of traffic.

This method may also be used when the sighting device is built into the signal lamp unit and it is desired to either adjust or check the parallelism between the sighting device and the beam from the signal lamp.

Although I have herein shown and described only one form of apparatus embodying my invention, it is understood that various changes and modifications may be made therein within the scope of the appended claim without departing from the spirit and scope of my invention.

Having thus described my invention, what I claim is:

A target reflector for use on a highway for aligning highway crossing signals comprising a box, a reflector panel within said box, said reflector panel having a cruciform arrangement of reflector buttons, a pair of side panels hinged at opposite sides of said reflector panel, a top panel hinged at the top of said reflector panel; said panels when folded inwardly forming a cover for said reflector panel; and cooperating latch means on said side and top panels to hold said panels open to form a hood for said reflector panel.

WESLEY B. WELLS.

REFERENCES CITED

The following references are of record in the file of this patent:

UNITED STATES PATENTS

| Number | Name | Date |
| --- | --- | --- |
| 220,853 | McEvoy | Oct. 21, 1879 |
| 1,454,001 | Smithers | May 1, 1923 |
| 1,525,758 | Christie | Feb. 10, 1925 |
| 1,610,948 | Huff | Dec. 14, 1926 |
| 1,615,621 | Goodnow | June 25, 1927 |
| 1,651,126 | Ingalls | Nov. 29, 1927 |
| 1,651,301 | Stewart et al. | Nov. 29, 1927 |
| 1,688,018 | Ostnaes | Oct. 16, 1928 |
| 2,050,579 | Murray | Aug. 11, 1936 |
| 2,062,878 | Hammel | Dec. 1, 1936 |
| 2,109,286 | Cubby | Feb. 22, 1938 |
| 2,160,426 | Archer | May 30, 1939 |
| 2,272,296 | Gallagher | Feb. 10, 1942 |
| 2,305,665 | Bolsey | Dec. 22, 1942 |
| 2,442,504 | Miller | June 1, 1948 |